United States Patent
Yang

(10) Patent No.: US 9,163,742 B2
(45) Date of Patent: Oct. 20, 2015

(54) FAUCET VALVE SEAT

(71) Applicant: Everfit Technology Co., LTD., Hemei Township, Changhua County (TW)

(72) Inventor: Jen-Tzu Yang, Hemei Township, Changhua County (TW)

(73) Assignee: Everfit Technology Co., LTD., Hemei Township (TW)

( * ) Notice: Subject to any disclaimer, the term of this patent is extended or adjusted under 35 U.S.C. 154(b) by 72 days.

(21) Appl. No.: 14/102,656

(22) Filed: Dec. 11, 2013

(65) Prior Publication Data

US 2015/0159768 A1    Jun. 11, 2015

(51) Int. Cl.
*F16K 27/06* (2006.01)
*F16K 11/00* (2006.01)
*F16K 5/04* (2006.01)

(52) U.S. Cl.
CPC .............. *F16K 27/065* (2013.01); *F16K 5/045* (2013.01); *F16K 19/006* (2013.01); *Y10T 137/86823* (2015.04)

(58) Field of Classification Search
CPC ..... F16K 27/065; F16K 5/045; F16K 19/006; Y10T 137/86823
See application file for complete search history.

(56) References Cited

U.S. PATENT DOCUMENTS

| | | | | |
|---|---|---|---|---|
| 5,331,997 A * | 7/1994 | Bosio | ............................. | 137/270 |
| 6,786,240 B2 * | 9/2004 | Ouyoung | ....................... | 137/801 |
| 6,802,334 B2 * | 10/2004 | Ericsson | ........................ | 137/270 |
| 7,198,064 B1 * | 4/2007 | Hsiao | ......................... | 137/625.4 |
| 7,484,524 B1 * | 2/2009 | Yu | .............................. | 137/315.12 |
| 7,533,683 B2 * | 5/2009 | Ortega et al. | ............... | 137/15.18 |
| 8,033,290 B2 * | 10/2011 | Hsiao | ........................ | 137/315.12 |
| 8,925,572 B2 * | 1/2015 | Shih | .......................... | 137/315.12 |

* cited by examiner

*Primary Examiner* — John Fox
(74) *Attorney, Agent, or Firm* — Curatolo Sidoti Co. LPA; Joseph G. Curatolo; Salvatore A. Sidoti

(57) ABSTRACT

A faucet valve seat includes a main body and a valve body. The main body is made of stainless steel, defines an internal space, and is formed with a water inlet communicating the internal space, a coupling opening adapted to be engaged with a switch handle of a faucet assembly, and a water outlet communicating the internal space and adapted to be engaged with a discharge pipe of the faucet assembly. The valve body is disposed in and adhered to the internal space, corresponds in position to the water outlet, and has several valve holes that are blocked and unblocked via operation of the switch handle for controlling water to flow from the water inlet to the water outlet.

2 Claims, 8 Drawing Sheets

FAUCET VALVE SEAT

BACKGROUND OF THE INVENTION

1. Field of the Invention

The invention relates to a faucet, more particularly to a two-piece faucet valve seat that is easy to manufacture and that reduces cost.

2. Description of the Related Art

In the past, faucets/taps were usually made of iron materials. Due to iron being prone to rusting, some manufacturers have adopted using copper alloy instead. However, copper alloy tends to be more expensive and also contains harmful heavy metals such as lead. Some manufacturers adopt zinc alloy instead. Nevertheless, zinc alloy has lower structural strength and poor resistance against corrosion, shortening the service life of these faucets/taps.

In summary, faucets/taps made from any of the aforementioned materials have their respective disadvantages. Moreover, due to the fact that these materials also have poor glossiness that in order to create a better appearance, a plating treatment is performed, which is not only costly but also pollutes the environment.

Referring to FIG. 1, a conventional faucet 10 includes a tubular main body 11, a discharge pipe 12 and a switch handle 13. The main body 11 has a divider portion 113 and first and second compartments at either side of the divider portion 113. The first compartment has an open end 111 for connecting a liquid source, and the second compartment has an open end 112 for mounting the switch handle 13. The divider portion 113 is formed with a plurality of valve holes 114, which cooperate with a valve member 131 that is disposed below the switch handle 13. The divider portion 113 is formed with a liquid discharge hole 115 through an outer surface thereof for mounting the discharge pipe 12. A liquid inlet pipe 116 is disposed in the first compartment for connecting the liquid source with the valve holes 114 for transferring liquid from the liquid source into the valve holes 114. When a user operates the switch handle 13, the valve member 131 is driven to bring the liquid from the liquid source toward the liquid discharge hole 115 and out of the discharge pipe 12.

The conventional faucet 10 has the following disadvantages. In order to create the tubular main body 11 with the divider portion 113 in a one-piece structure, a blank of the main body 11 is pre-developed by casting, forging, etc., followed by the use of different machines for drilling, milling, etc., to form the first and second compartments and the valve holes 119. A majority of the materials used to make the blank will be cut away during the subsequent drilling/milling process, leading to significant waste. Furthermore, in order to create the first and second compartments, deep-hole cutting method has to be applied on the blank, which is a complex manufacturing process.

SUMMARY OF THE INVENTION

Therefore, the object of the present invention is to provide a faucet valve seat that can eliminate the aforesaid drawbacks of the prior art.

According to the present invention, there is provided a faucet valve seat adapted to be used with a faucet assembly that includes a switch handle and a discharge pipe connected to the faucet valve seat. The faucet valve seat includes a main body and a valve body.

The main body is made of stainless steel, has an internal surface that defines an internal space, and is formed with a water inlet, a coupling opening and a water outlet. The water inlet fluidly communicates the internal space, the coupling opening is adapted to be engaged with the switch handle, and the water outlet fluidly communicates the internal space and is adapted to be engaged with the discharge pipe.

The valve body is disposed in the internal space, corresponds in position to the water outlet, and has an outer surrounding surface adhered to the internal surface of the main body. The valve body further has a plurality of valve holes that are blocked and unblocked via operation of the switch handle for controlling water to flow from the water inlet to the water outlet through the valve holes.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
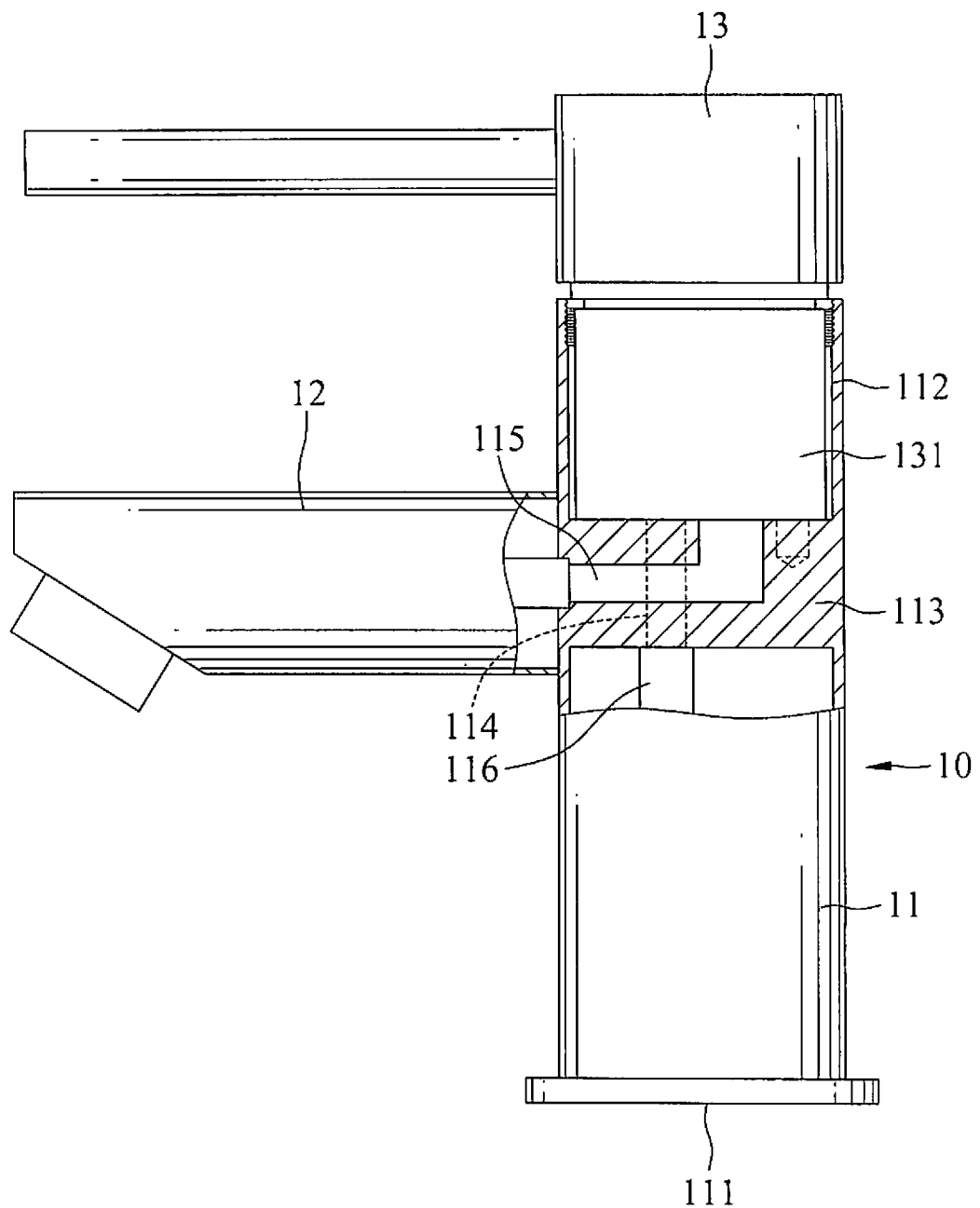
FIG. 1 is an assembled partly-sectional view of a conventional faucet.

Before the present invention is described in greater detail, it should be noted that like elements are denoted by the same reference numerals throughout the disclosure.

Figure 2:
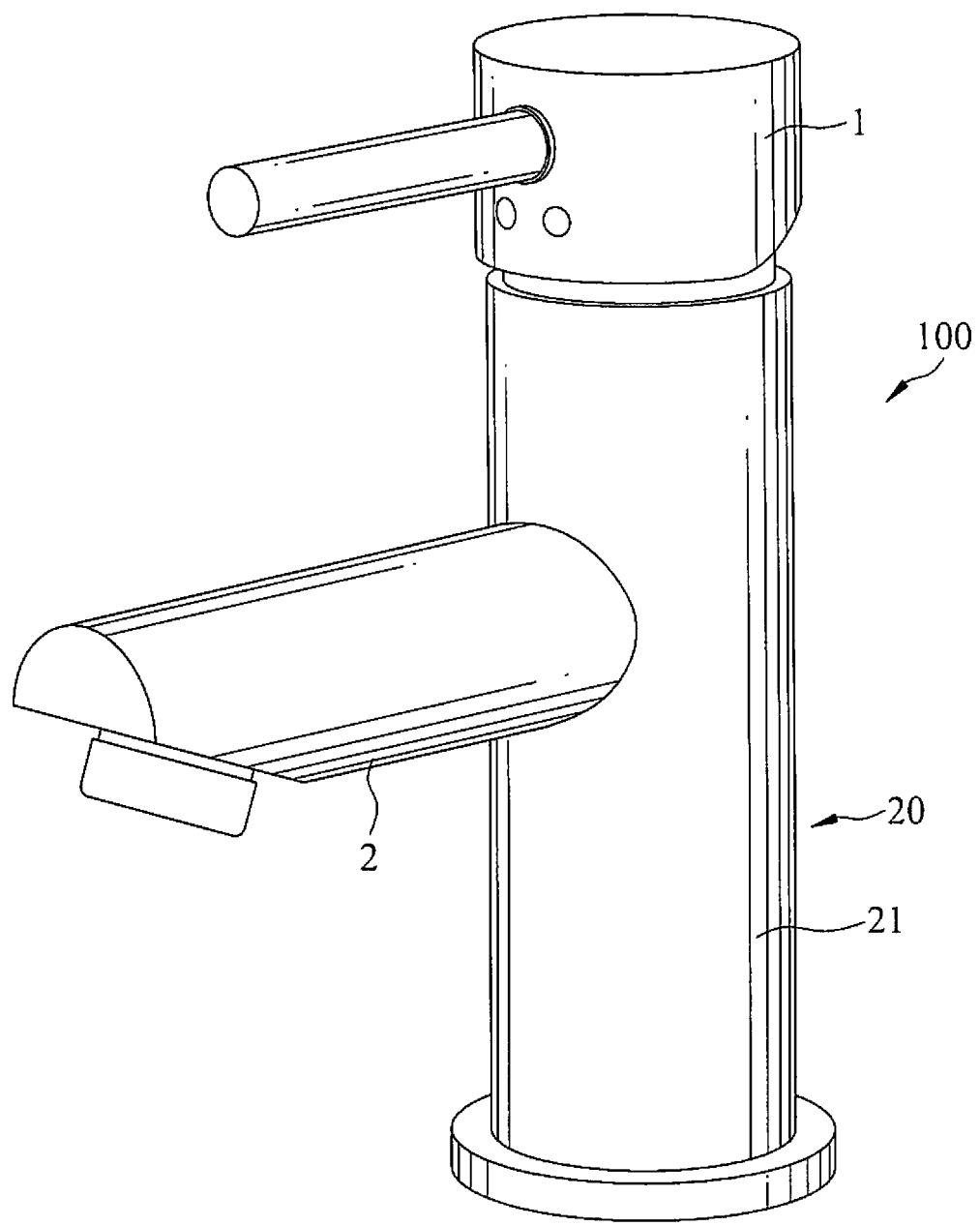
FIG. 2 is an assembled perspective view of the first preferred embodiment of a faucet valve seat according to the present invention, for illustrating the preferred embodiment when used with a faucet assembly.
Figure 3:
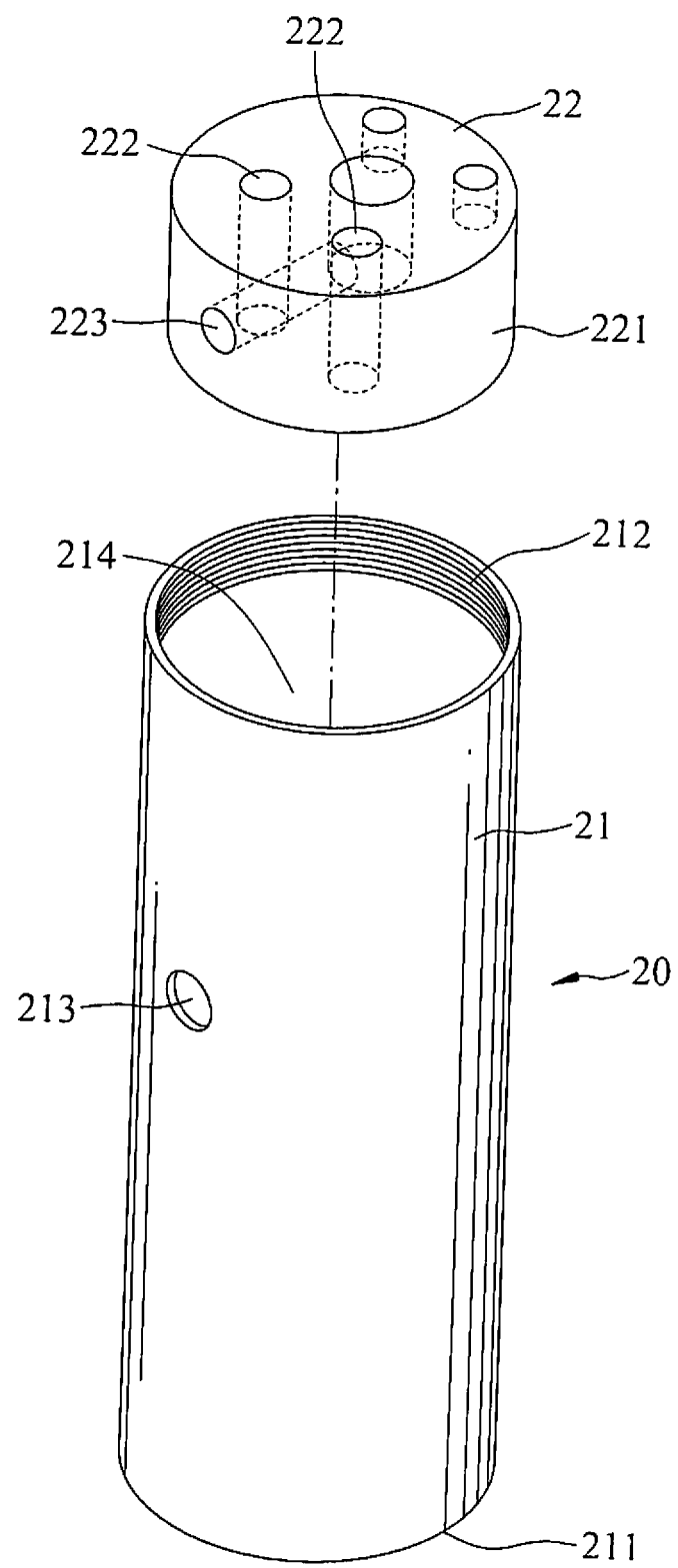
FIG. 3 is an exploded perspective view of the first preferred embodiment, for illustrating a main body and a separate valve body.
Figure 4:
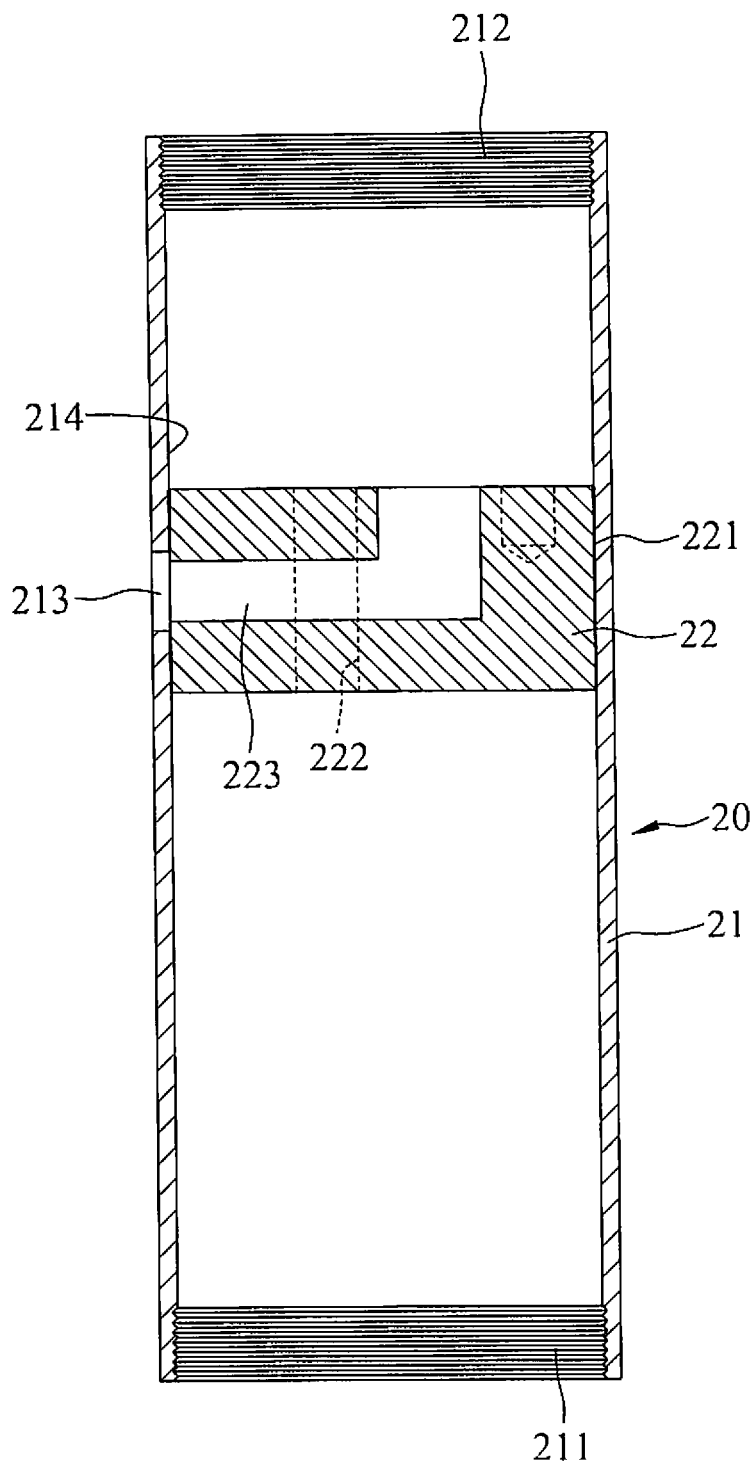
FIG. 4 is an assembled sectional side view of the first preferred embodiment for illustrating the valve body adhered to the main body.

Referring to FIGS. 2 to 4, the first preferred embodiment of a faucet valve seat 20 according to the present invention is adapted to be used with a faucet assembly 100. The faucet assembly 100 includes a switch handle 1 and a discharge pipe 2 connected to the faucet valve seat 20, and a water intake pipe 3 (see FIG. 5) connected to a water source and in fluid communication with the faucet valve seat 20. The faucet valve seat 20 includes a main body 21 and a valve body 22.

In this embodiment, the main body 21 is tubular and elongated and is made of stainless steel. The main body 21 defines an internal space 214, and is formed with a water inlet 211, a coupling opening 212 and a water outlet 213. The water inlet 211 fluidly communicates the internal space 214, the coupling opening 212 is adapted to be engaged with the switch handle 1, and the water outlet 213 fluidly communicates the internal space 214 and is adapted to be engaged with the discharge pipe 2.

Figure 5:
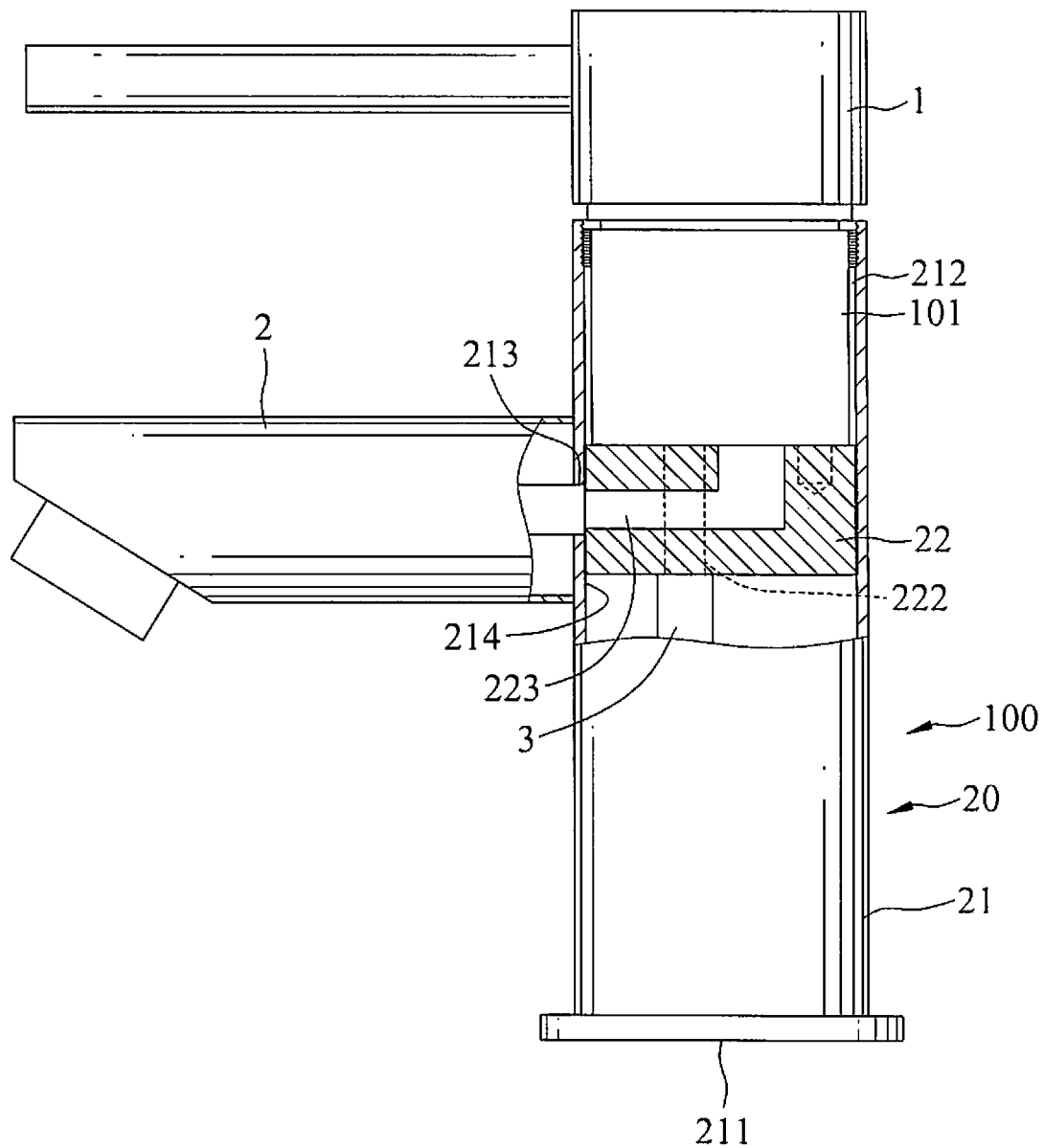
FIG. 5 is an assembled partly-sectional view of the first preferred embodiment when used with the faucet assembly.

The valve body 22 is made of stainless steel into a circular disc shape, is disposed in the internal space 214 of the main body 21, corresponds in position to the water outlet 213 and has an outer surrounding surface 221 adhered to the internal surface of the main body 21. In this embodiment, an adhesive is applied onto the outer surrounding surface 221 of the valve body 22, and the valve body 22 is then pushed into the internal space 214 of the main body 21. The valve body 22 further has a plurality of valve holes 222 that extend upright and that are blocked and unblocked via operation of the switch handle 1 for controlling water to flow from the water inlet 211 to the water outlet 213 through the valve holes 222. The valve body 22 is further formed with an outlet hole 223 that is registered with the water outlet 213 of the main body 21. Referring to FIG. 5, the top portion of the water intake pipe 3 is connected to the valve holes 222 of the valve body 22 such that water can be transported from the liquid source through the water intake pipe 3 and into the valve body 22. The valve holes 222 cooperate with a valve member 101, which is disposed below the switch handle 1, in a manner that when a user operates the switch handle 1 (e.g., by pressing, turning, etc.), the valve member 101 is driven to allow water to flow into the outlet hole 223 and out of the discharge pipe 2.

Figure 6:
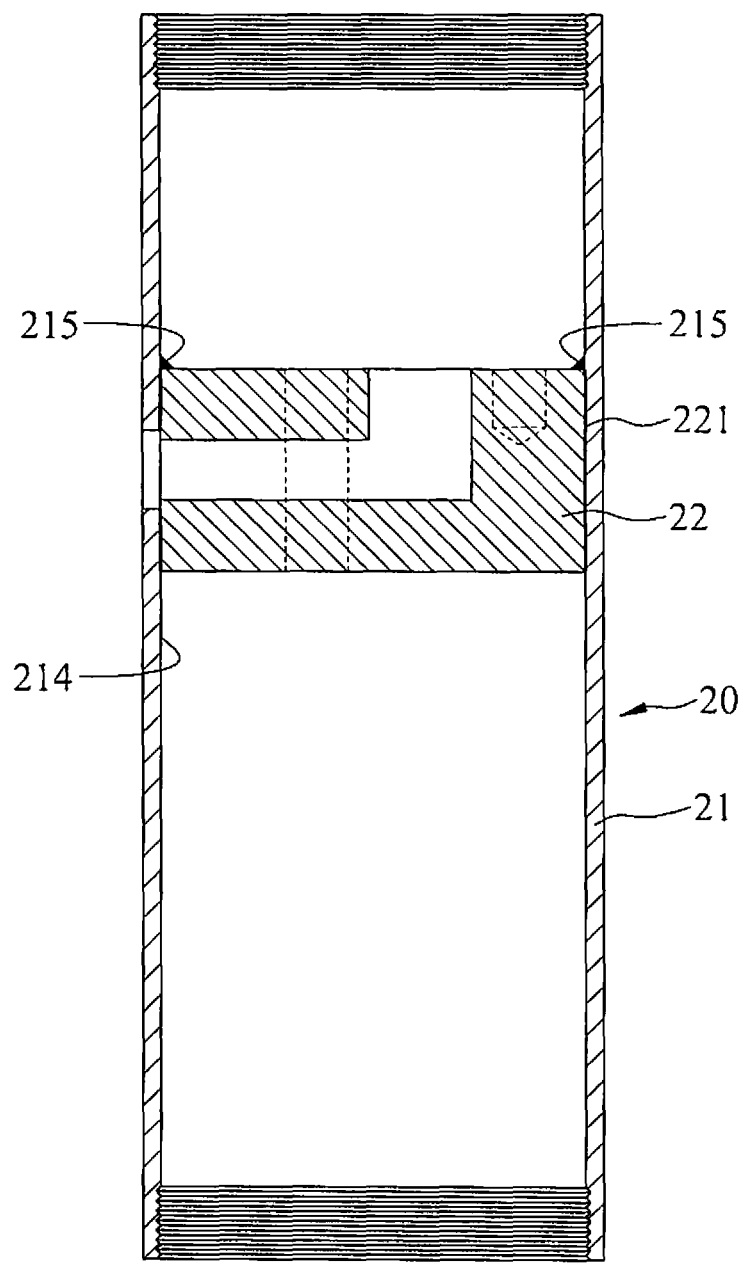
FIG. 6 is an assembled sectional side view of the second preferred embodiment of a faucet valve seat according to the present invention.

In view of the current standards of industrial development, the adhesion between metals is known to be firm and durable. Further enhancement of the coupling between the valve body 22 and the main body 21 may be provided, as shown by the second preferred embodiment with reference to FIG. 6. The second preferred embodiment of a faucet valve seat 20 according to the present invention is similar to the structure of the first preferred embodiment and differs in that the main body 21 is provided with a plurality of securing members 215 welded on the internal surface thereof and adhered to the valve body 22 so that the valve body 22 is further secured to the main body 21.

The advantages of this invention are described as follows.

The faucet valve seat 20 of this invention is designed to simplify its manufacturing process and reduce its cost. The main technical means applied is that the faucet valve seat 20 is divided into two separate components: the main body 21 and the valve body 22. Since the main body 21 is made of stainless steel which is corrosion-proof, the plating treatment is dispensed to meet the environmental protection requirement. More importantly, the complex process of structuring the one-piece main body 11 (see FIG. 1) of the prior art is no longer needed. A simple straight tube structure and a simple disc structure can be separately made, thus dispensing with the cutting operations and reducing waste generated during the manufacturing process.

Figure 7:
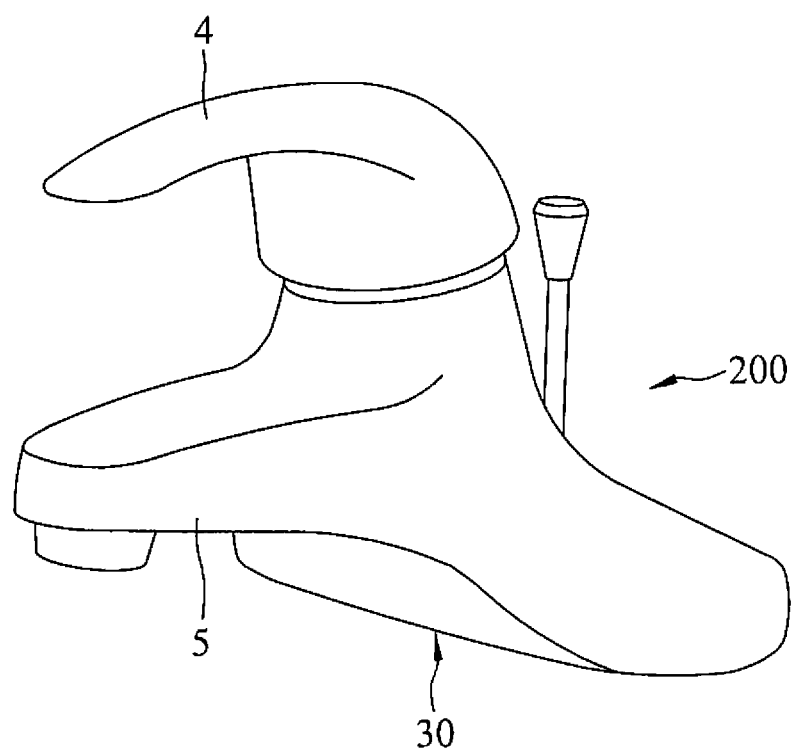
FIG. 7 is a perspective view of the third preferred embodiment of a faucet valve seat according to the present invention when used with a different kind of faucet assembly.

It is worth mentioning that the faucet valve seat 20 of this invention can be used with a variety of faucet assemblies. Referring to FIG. 7, the third preferred embodiment of a faucet valve seat 30 according to the present invention is shown to be incorporated in a faucet assembly 200 that includes a switch handle 4. The faucet valve seat 30 includes an integrally formed discharge pipe 5. The switch handle 4 is mounted on top of the faucet valve seat 30 for controlling water flow through the discharge pipe 5. This type of faucet 200 is usually used in bathroom basins.

Figure 8:
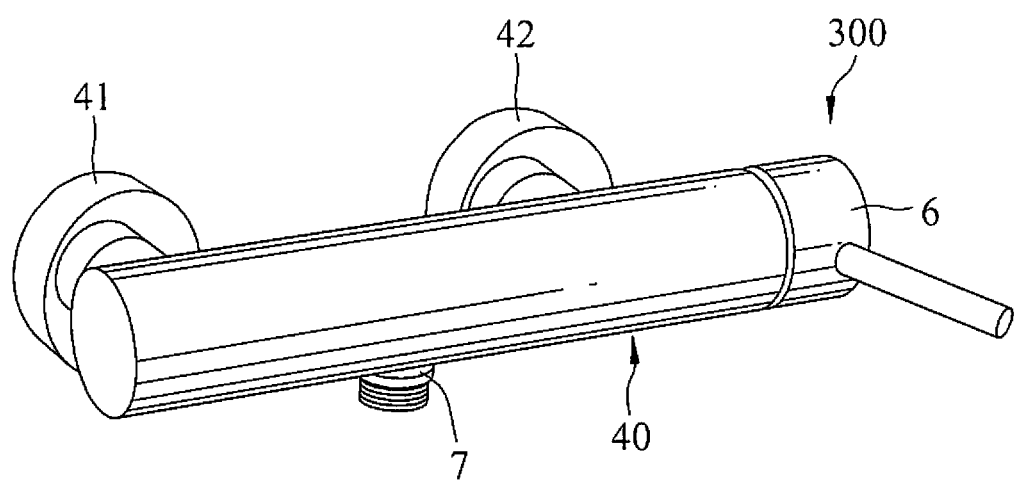
FIG. 8 is a perspective view of the fourth preferred embodiment of a faucet valve seat according to the present invention when used with another kind of faucet assembly.

Referring to FIG. 8, the fourth preferred embodiment of a faucet valve seat 40 according to the present invention is shown to be used on a faucet assembly 300 that includes a switch handle 6 and a discharge pipe 7. The faucet valve seat 40 is provided with a cold water inlet opening 41 and a hot water inlet opening 42, while the switch handle 6 is mounted on one end of the faucet valve seat 40 for controlling water flow through the discharge pipe 7. This type of faucet assembly 300 is usually used in a shower.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A faucet valve seat adapted to be used with a faucet assembly, the faucet assembly including a switch handle and a discharge pipe that are connected to said faucet valve seat, said faucet valve seat comprising:
   a main body made of stainless steel, having an internal surface that defines an internal space, and formed with
   a water inlet that fluidly communicates said internal space,
   a coupling opening that is adapted to be engaged with the switch handle, and
   a water outlet that fluidly communicates said internal space and that is adapted to be engaged with the discharge pipe; and
   a valve body disposed in said internal space, corresponding in position to said water outlet, and having an outer surrounding surface that is adhered to said internal surface of said main body, said valve body further having a plurality of valve holes that are blocked and unblocked via operation of the switch handle for controlling water to flow from the water inlet to the water outlet through said valve holes,
   wherein said main body further has a securing member welded on said internal surface and adhered to said valve body.

2. The faucet valve seat as claimed in claim 1, wherein said main body and said valve body are made as separate pieces.

* * * * *